Jan. 13, 1925.

C. M. COLE 1,523,168

GASOLINE GAUGE

Original Filed April 10, 1917

WITNESSES
Frederick L. Fox,
N. G. Pierson

INVENTOR
Clifford M. Cole.

BY Victor J. Evans.

ATTORNEY

Patented Jan. 13, 1925.

1,523,168

UNITED STATES PATENT OFFICE.

CLIFFORD M. COLE, OF DAYTON, OHIO, ASSIGNOR OF ONE-HALF TO WILLIAM S. ADAMS, OF RIVERTON, WYOMING.

GASOLINE GAUGE.

Application filed April 10, 1917, Serial No. 161,036. Renewed August 12, 1919. Serial No. 317,102.

*To all whom it may concern:*

Be it known that I, CLIFFORD M. COLE, a citizen of the United States, residing at Dayton, in the county of Montgomery and State of Ohio, have invented new and useful Improvements in Gasoline Gauges, of which the following is a specification.

This invention is a liquid level indicator and relates more particularly to that class of devices to be used upon self propelled vehicles, wherein the tank is more or less positioned in an inaccessible position.

In that class of self-propelled vehicles wherein the tank is carried at the rear end, there is no way of determining the amount of contents remaining in the tank without going to the rear end for investigation. This necessitates the stopping of the machine, or vehicle, in order to determine the same.

On those machines or vehicles in which the gasoline tank is mounted underneath the front seat, the cushions have to be raised, the cover taken off the tank, and some form of measuring stick inserted in order to determine the amount of the contents of the tank. All of these features of construction are objectionable, as they do not provide a ready means for showing to the driver how much gasoline remains in the tank.

This invention aims to overcome these several objections by providing a mechanism which may be inserted into any tank, and to which may be connected a dial for clearly and at all times indicating the quantity of liquid or gasoline remaining in the tank.

This invention comprises, broadly stated, a cover plate provided with a depending hanger, an adjustable arm pivotally carried by the hanger, a float operatively connected to the arm, a gauge including a dial plate and an indicator needle, means to operatively connect the arm to the needle, and means to removably secure the cover plate to the tank.

One practical form of the invention will be described and illustrated in the accompanying drawings, in which:—

Figure 1:
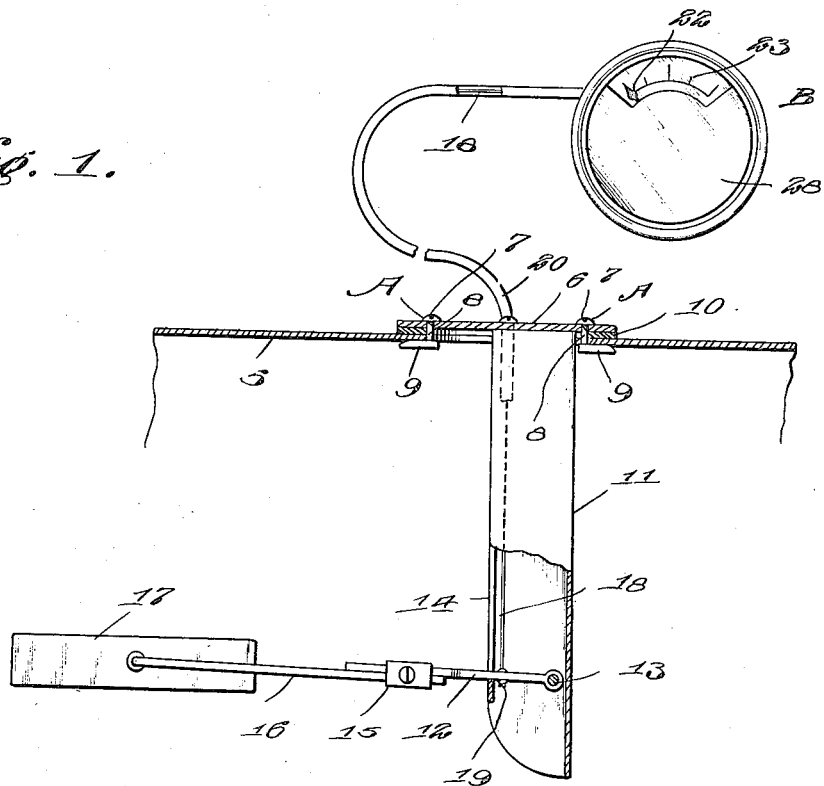
Figure 1 is a transverse sectional view of a tank with the indicator positioned therein, and includes a gauge connected to the indicator.
Figure 2:
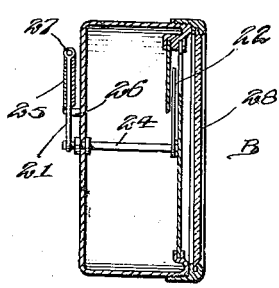
Figure 2 is a vertical sectional view of the gauge.
Figure 3:
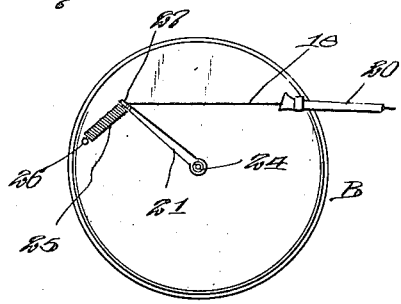
Figure 3 is a bottom plan view of the gauge, showing the manner of bringing the needle to a zero position.

As shown in Figure 1, the tank 5 is provided with an opening or aperture through which the indicating mechanism may be inserted so as to lie within the tank. This opening is closed by means of the cover plate 6 through which pass the locking elements A. Only three of these locking means are shown, but any number may be employed. As shown in Figure 1, these locking means comprise a head 7, a shank or shaft 8, and an arm 9 which extends at right angles to the shank or shaft 8. This arm 9 is so shaped that when the head 7 is turned so as to bring the arm 9 into engagement with the tank 5, the gasket 10, which is interposed between the cover plate 6 and the tank 5 will be compressed and thereby form a liquid tight joint.

Depending from the cover plate 6 is an element which may be termed a housing or hanger 11. The lower end of this housing 11 is preferably open and carries near its lower end an arm 12, which is shown as having a pivotal mounting at 13. The wall 14 of this housing is shown cut away, and acts as a stop member for the arm 12 in one direction. This arm 12 is provided with a slidable and adjustable connection 15 to which is connected the float arm 16. At the outer end of the arm 16 there is mounted a cork or metal float 17 of any approved design or construction. By means of the adjustable connection 15 the float 17 may be positioned at different points within the tank, and thus the leverage obtained when connected to the several parts to be hereinafter described is changed.

Intermediate between the pivotal connection 13 and the adjustable connection 15, there is connected a wire or other suitable element 18, the point of connection being indicated at 19. This wire 18 passes out through the cover plate 6 by means of the tube 20, and connects with the actuating arm 21, which is connected to the indicator needle 22 of the gauge B. As shown and described, it is thought preferable to provide a small flexible connection between the arm 12 and the needle 22, so that the wire 18 in passing through the tube 20 may conform to the various bends that may be necessary to be made in the tube, as would be when the gauge B is mounted upon the instrument board (not shown).

The gauge B may be of any preferred type or form, and is shown as being circular, and the graduations 23 are purely arbitrary. The actuating arm 21 preferably lies in the same plane as that of the needle 20 to which it is connected by means of the spindle 24. In order to maintain the needle 22 in a zero position, a spring element 25 is shown connected to one end of the arm 21 and to a stud 26. Extending from the other side of the arm 21 is the wire of the connecting cable 18. The point of connection between the wire 18 and the arm 21 is indicated at 27. To prevent dust and also to permit of a quick reading of the dial 23, a glass cover 28 is employed. This glass 28 may be secured to the gauge B in any approved manner, such as is customary in devices of a like character.

As shown more particularly in Figure 1, the device is capable of being readily inserted through a suitable opening formed in the tank 5, and when so positioned therein may be fully secured thereto by means of the locking elements A, which when turned into the proper position will seal the opening against egress of liquid.

As the arm 12 to which is connected the arm 16 carrying the float 17 is freely mounted by means of the pivotal connection 13 any movement of the float 17 up or down will be communicated to the indicator needle 22 by means of the wire 18. As it is supposed that the gauge B will be mounted upon the instrument board any movement of the needle 22 will be in plain view of the driver, who thus at all times is enabled to see just what the contents of the gasoline tank may be.

Minor changes in the details of construction as herein set forth may be resorted to without departing from the spirit of the invention or the scope of the claims.

I claim:—

1. In a float control liquid gauge, an indicating device removed from the tank, and including an oscillatory indicating member mounted on a shaft in an indicator housing, an indicator housing, an arm mounted on said shaft outside of said housing, a spring having one end attached to the outside of the housing and the other end to the free end of the arm, said flexible reciprocatory connection having one end connected to the end of the arm adjacent the spring, a flexible guide tube closely but loosely enclosing the flexible connection and confining its path of to and fro movement, means projected into a tank for supporting a float, said means consisting of a depending U-shaped bracket between the walls of which said flexible connection passes for guidance thereby, a float arm pivoted at the lower end of said bracket, a stop on said bracket for limiting the downward movement of said float, said flexible connection being connected to said float arm within said bracket.

2. In a float control liquid gauge, an indicating device removed from the tank, and including an oscillatory indicating member mounted on a shaft in an indicator housing, an indicator housing, an arm mounted on said shaft outside of said housing, a spring having one end attached to the outside of the housing and the other end to the free end of the arm, said flexible reciprocatory connection having one end connected to the end of the arm adjacent the spring, a flexible guide tube closely but loosely enclosing the flexible connection and confining its path of to and fro movement, means projected into a tank for supporting a float, said means consisting of a depending U-shaped bracket between the walls of which said flexible connection passes for guidance thereby, a float arm pivoted at the lower end of said bracket, a stop on said bracket for limiting the downward movement of said float, said flexible connection being connected to said float arm within said bracket, and means for detachably connecting said bracket to said tank.

In testimony whereof I affix my signature.

CLIFFORD M. COLE.